(12) United States Patent
McLaughlin et al.

(10) Patent No.: US 8,426,338 B2
(45) Date of Patent: Apr. 23, 2013

(54) CHELATING AGENTS FOR MICRONUTRIENT FERTILISERS

(75) Inventors: Mike McLaughlin, Fullarton (AU);
Samuel Stacey, Aberfoyle Park (AU);
Enzo Lombi, Encounter Bay (AU)

(73) Assignee: Adelaide Research and Innovation Pty Ltd, Adelaide (AU)

( * ) Notice: Subject to any disclaimer, the term of this patent is extended or adjusted under 35 U.S.C. 154(b) by 609 days.

(21) Appl. No.: 11/988,668

(22) PCT Filed: Jul. 11, 2006

(86) PCT No.: PCT/AU2006/000951
§ 371 (c)(1),
(2), (4) Date: Mar. 17, 2009

(87) PCT Pub. No.: WO2007/006078
PCT Pub. Date: Jan. 18, 2007

(65) Prior Publication Data
US 2010/0029477 A1    Feb. 4, 2010

(30) Foreign Application Priority Data
Jul. 12, 2005   (AU) ................................ 2005903682

(51) Int. Cl.
*C05D 9/02*        (2006.01)
(52) U.S. Cl.
USPC ............ 504/101; 71/31; 71/DIG. 2; 564/512; 568/69
(58) Field of Classification Search .................. 504/101; 71/DIG. 2, 31–63; 564/512; 568/69
See application file for complete search history.

(56) References Cited

U.S. PATENT DOCUMENTS

| | | | | |
|---|---|---|---|---|
| 2,673,214 A | * | 3/1954 | Bersworth et al. | 562/14 |
| 2,906,762 A | * | 9/1959 | Knell et al. | 556/148 |
| 2,936,316 A | * | 5/1960 | Young, Jr. | 556/148 |
| 3,150,160 A | * | 9/1964 | Dexter | 514/502 |
| 3,703,545 A | * | 11/1972 | McCrary | 562/102 |
| 3,960,536 A | * | 6/1976 | Dumont et al. | 71/1 |
| 4,015,970 A | * | 4/1977 | Hennart | 71/11 |
| 4,332,609 A | * | 6/1982 | Ott | 71/27 |
| 4,394,149 A | * | 7/1983 | Szoka et al. | 71/28 |
| 4,505,732 A | * | 3/1985 | Aigner et al. | 71/11 |
| 5,194,559 A | * | 3/1993 | Okazaki et al. | 528/49 |

(Continued)

FOREIGN PATENT DOCUMENTS

| | | |
|---|---|---|
| EP | 1342413 | 9/2003 |
| GB | 1451269 | 9/1976 |
| GB | 2411896 | 9/2005 |
| WO | WO2005/026075 | 3/2005 |

*Primary Examiner* — Wayne Langel
(74) *Attorney, Agent, or Firm* — Renner Kenner Greive Bobak Taylor & Weber (57) ABSTRACT

The invention describes a method and product for chelating micronutrients when used to provide the micronutrients to a plant, which comprises applying to an area of the plant or soil/substrate surrounding the plant an effective amount of a plant fertiliser composition comprising a chelating polymer having the general formula (I), capable of forming coordinate bonds with the micronutrients, transporting the micronutrients across a membrane of the plant and releasing the micronutrients for use by the plant.

$$\left[ (CH_2CH_2X)_y - (CH_2CH_2XH)_z \right]_n \quad (I)$$
$$| \quad (CH_2CH_2XH_2)_w$$

15 Claims, 4 Drawing Sheets

U.S. PATENT DOCUMENTS

| | | |
|---|---|---|
| 5,593,947 A | 1/1997 | Kinnersley et al. |
| 6,331,198 B1 * | 12/2001 | Puttan et al. ....................... 71/28 |
| 6,383,245 B1 * | 5/2002 | Yamashita .......................... 71/6 |
| 6,615,539 B1 * | 9/2003 | Obonai et al. ................. 47/62 N |
| 6,870,026 B1 | 3/2005 | Dean |
| 2003/0089150 A1 * | 5/2003 | Markusch et al. ................... 71/1 |
| 2003/0131642 A1 * | 7/2003 | Miele et al. ....................... 71/61 |
| 2004/0230020 A1 | 11/2004 | Sanders et al. |

* cited by examiner

CHELATING AGENTS FOR MICRONUTRIENT FERTILISERS

FIELD OF THE INVENTION

The present invention relates to a composition and method for improving the bioavailability of micronutrients to plants.

DESCRIPTION OF THE PRIOR ART

Agriculture is a multi-million dollar industry. In order to improve plant growth good fertile soils are required and, in the absence of these, fertilisers are often used in order to facilitate the growth of agricultural crops.

Essential nutrients for plant growth include metal ions, such as Cu, Zn, Mn, etc. which are crucial to various metabolic pathways of plants such as photosynthesis and so forth. Traditional farming methods have resulted in general deficiency of such metal ions in soil and indeed in some areas these metal ions are almost completely absent and this can result in diminished yields and poor plant growth of crops grown in such areas. It is well known that the addition of surplus metal ions to either the soil or plant foliage can help to significantly alleviate such growth deficiencies in agricultural crops. One of the more common ways of delivering the appropriate metal micronutrient has been to form a chelated complex of the metal ion with a synthetic chelate as this maintains the metal ion in a soluble form for ease of application and reduces metal adsorption and fixation in soil.

Currently there are a number of synthetic chelating agents in use including EDTA, EDDHA, DTPA and NTA. The most commonly used of these is EDTA (ethylenediaminetetraacetic acid), which has a wide range of commercial uses from detergents to food additives.

As a chelating agent, EDTA has a strong affinity for metal ions to form metal-EDTA complexes. EDTA is a polyprotic acid with two tertiary amine groups that can also become protonated. The result is a ligand that can bind 1:1 with many metals ions.

In 1997 global production of EDTA was in the order of 32,500 tons and has risen significantly. The use of EDTA is becoming increasingly restricted in Europe due to its overuse and the compound has been classified as a persistent substance.

Citric acid has been previously used as a chelating agent to provide an inexpensive alternative. The major drawback with metal ion-citric acid chelates is that they are unstable at pH >7.

OBJECT OF THE INVENTION

It is an object of the present invention to provide new metal chelating compounds that are capable of delivering micronutrients to plant crops.

It is a further object of the present invention to overcome, or at least substantially ameliorate, the disadvantages and shortcomings of the prior art.

Other objects and advantages of the present invention will become apparent from the following description, taking in connection with the accompanying drawings, wherein, by way of illustration and example, an embodiment of the present invention is disclosed.

SUMMARY OF THE INVENTION

What we have found then is that by employing a compound being a chelating polymer, the chelating polymer has the capability of chelating metal ions such as copper, zinc, manganese, iron etc, in a very efficient manner. The action of chelating polymers are in contrast to the action of EDTA and other conventionally used chelating agents, which are not generally absorbed by plant roots and indeed are known to compete against the plant roots for the micronutrients present in the rhizosphere, being the zone that surrounds the roots of the plants.

According to the present invention, although this should not be seen as limiting the invention in any way, there is provided a method of chelating micronutrients when used to provide the micronutrients to a plant, which comprises applying to an area of the plant or soil/substrate surrounding the plant an effective amount of a plant fertiliser composition comprising a chelating polymer capable of forming coordinate bonds with the micronutrients, transporting the micronutrients across a membrane of the plant and releasing the micronutrients for use by the plant.

In preference, the chelating polymer is a polythiol or polyamine.

In preference, the polyamine is selected from the group consisting of polyamidoamine, polyethyleneamine, polyethyleneimine, polyethylenimine and dendrimers thereof.

In preference, the chelating polymer is linear.

In preference, the chelating polymer is branched.

In preference, the chelating polymer has the general formula (I):

(I)

wherein X=N or S and W is equal to or greater than 0, and y, z and n are equal to or greater than 1.

In preference, when X=N the molecular weight is between approximately 400 and 25,000.

When X=N this is then the compound polyethyleneimine (PEI), which is a water-soluble polymer that has a high concentration of chelating sites thus allowing for a higher metal binding capacity than EDTA.

In preference, the composition is applied in combination with the micronutrients, either alone or in combination, Mn, Zn, Cu, Fe, Ni.

In preference, the composition is applied either alone or in combination with the macronutrients N, P, K, S, Ca, Mg.

In preference, the composition is in a form selected from the group consisting of liquids, suspensions, dispersions, emulsions, powders, and pellets.

In preference, the composition further includes a pesticide and/or insecticide.

In preference, the composition is applied to the foliage of the plant, soil or other substrate, seeds, fruits, shoots, flowers or nuts.

In a further aspect of the invention there is provided a method of increasing the bioavailability of nutrients to plant roots or foliage, comprising applying an effective amount of a plant fertiliser composition including the polymer PEI having the formula (I):

(I)

wherein X=N or S and W is equal to or greater than 0, and y, z and n are equal to or greater than 1.

In preference, when X=N the molecular weight is between approximately 400 and 25,000.

In yet a further aspect of the invention there is described a plant fertiliser composition including a chelating polymer capable of forming coordinate bonds with micronutrients and releasing the micronutrients for use by the plant, when used to increase the rate of micronutrient uptake by the plant.

In preference, the chelating polymer is a polythiol or polyamine.

In preference, the polyamine is selected from the group consisting of polyamidoamine, polyethyleneamine, polyethyleneimine and dendrimers thereof.

In preference, the chelating polymer is linear.

In preference, the chelating polymer is branched.

In preference, the chelating polymer has the general formula (I):

(I)

wherein X=N or S and W is equal to or greater than 0, and y, z and n are equal to or greater than 1.

In preference, when X=N the molecular weight is between approximately 400 and 25,000.

In preference, the composition is in a form selected from the group consisting of liquids, suspensions, dispersions, emulsions, powders, and pellets.

In preference, the composition includes a pesticide and/or insecticide.

In preference, the composition is applied to the foliage of the plant, soil or other substrate, seeds, fruits, shoots, flowers or nuts.

In preference, the composition is applied as a seed coat or pretreatment to the seed prior to planting.

In preference, the composition is applied in combination with the micronutrients, either alone or in combination, Mn, Zn, Cu, Fe, Ni.

In preference, the composition is applied either alone or in combination with the macronutrients N, P, K, S, Ca, Mg.

As will be appreciated by those skilled in this particular field, the invention will have many other uses in other related industries such as horticulture and aquaculture, wherever there is a need to supply micronutrients.

BRIEF DESCRIPTION OF THE DRAWINGS

By way of example, an employment of the invention is described more fully the renown for with reference to the accompanying drawings, in which.

DETAILED DESCRIPTION OF THE INVENTION

Having now generally described the invention, a further understanding can be obtained by reference to certain specific examples that are provided herein for purposes of illustration only and are not intended to be limiting.

Broadly speaking, the current invention provides an improved and more economical fertiliser composition that can deliver trace amounts of micronutrients to plants.

The Use of PEI (polyethyleneimine) to Chelate Zn on Alkaline and Calcareous Soils The purpose is to show how PEI increases the availability of Zn fertiliser to Canola grown on alkaline and calcareous soils. The performance of this ligand was benchmarked against EDTA, the most commonly used chelating agent on alkaline and calcareous soils in Australia.

Materials and Methods

A pot experiment was designed to test the availability of Zn to Canola when applied to calcareous and alkaline soils either as $ZnSO_4.7H_2O$ or chelated with PEI or EDTA.

Figure 2:
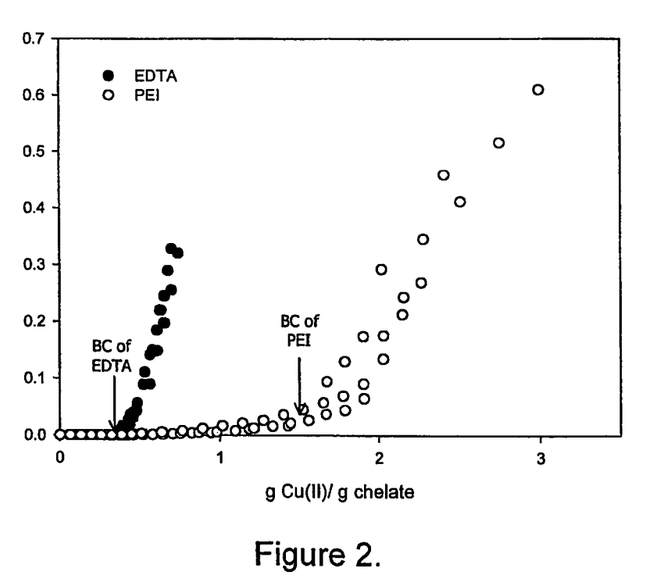
FIG. 2 is a graph showing the Cu(II) binding capacities (BC) of EDTA and PEI.

Soil samples were collected from field sites known to be Zn responsive at Streaky Bay, South Australia and Birchip, Victoria (Table 1). Topsoils from each location were collected, oven dried and passed through a 2 mm sieve. The $^{65}Zn$ labelled experimental fertilisers were mixed with 20 g of soil, which was banded between 100 g of the unfertilised bulk soil. Total nutrient application equated to (μg/g soil) P 60, N 27, applied as TGMAP, and Zn 0.2 as $ZnSO_4.7H_2O$. Chelate rates were based on the concentrations required to complex 100% of the Zn in the fertiliser solution. Rates varied depending on the stoichiometry of the Zn-ligand complexes. GEOCHEM was used to predict the degree of chelation in the EDTA fertiliser solution. The metal binding capacity of PEI was established in a previous experiment using $Cu^{2+}$ and a Cu(II) ISE (FIG. 2). Chelate application rates were (μM/g soil) PEI 0.043 and EDTA 0.37. Experimental controls were chelate free ($ZnSO_4$ only) and chelate and Zn free. Each treatment was replicated four times.

Two pre-germinated Canola seeds (variety Pinnacle) were transferred to each pot. The pots were watered to θg=0.5 with deionised water every second day and evaporation was reduced with polyethylene beads, which were spread over the exposed surface of each pot. The plants were grown for 21 days in a controlled environment growth chamber (10 h dark at 15° C., 14 h light at 20° C., 41% humidity) before the shoots were harvested, rinsed, dried, weighed and then digested in concentrated $HNO_3$. Plant digests were analysed for $^{65}Zn$ by gamma spectroscopy and for total nutrient contents by ICP-OES.

Analysis of Data

Data for shoot dry weight, shoot nutrient concentrations and Zn fertiliser uptake were analysed by analysis of variance (ANOVA). Significance between means was determined using the Least Significant Difference (LSD) test.

Results

TABLE 1

Properties of the soils used for the experiments[a].

| Site | Soil description and Classification | Carbonate (%) | pH (H$_2$O) | % Clay |
|---|---|---|---|---|
| Streaky Bay | Calcareous grey sandy loam | 39 | 8.7 ± .02 | 25 |
| Birchip | Sodosol light clay | 2.8 | 8.8 ± 0.01 | 40 |

[a] oven dry soil

EDTA was ineffective on both the calcareous grey sandy loam from streaky bay and the Sodosol from Birchip, Victoria (FIG. 1) (LSD=1.72). PEI significantly increased total Zn uptake by canola on the Birchip Sodosol (p<0.01). The PEI treatment was statistically similar to ZnSO$_4$, but more effective than ZnEDTA, on the calcareous soil. The results from the PEI treatment applied to Birchip soil are highly significant, given that the PEI application rate was 8.6 times smaller than that of EDTA.

Effect of Chelate Rate on Zn in Soil Solutions

Figure 1:
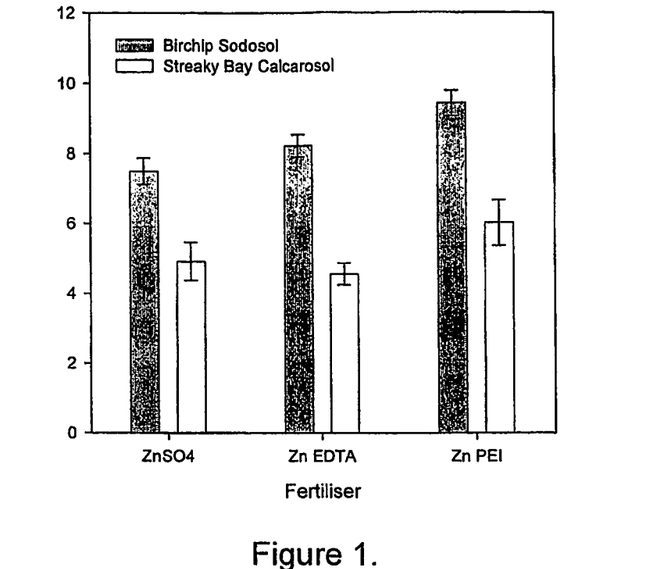
FIG. 1 is a graph of Total Zn absorbed by canola roots and translocated into shoots (±1 S.E)

The purpose is to show that EDTA, which forms a negatively charged complex with divalent metal ions such as Zn, increases the concentration of micronutrients retained within the soils solution phases. However, the increase in soluble Zn that was attributed to EDTA did not increase the uptake of Zn by canola (FIG. 1).

The purpose is to show that PEI behaves in a different manner to EDTA in soil, which resulted in increased uptake of micronutrient fertiliser by plants.

Materials and Methods

The soils and fertiliser rates used in this experiment were similar to those applied to the fertiliser band in the pot experiment already described.

Five grams of oven dry soil were weighed into 50 ml polypropylene vials (Table 1). Fertiliser solutions, containing 6 µg of Zn as ZnSO$_4$.7H$_2$O and either EDTA or PEI, were applied to the soils. Chelates were applied at 7 rates to consider the full range of ligand concentrations used in the pot experiment already described. EDTA and PEI rates were (µM/g soil) 0.008 0.018, 0.03, 0.04, 0.05, 0.062 and 0.07. The soil solution phase was made up to 25 ml with deionised water.

The soils and fertiliser solutions were shaken end-over-end for 24 hours. After shaking, vials were centrifuged for 20 minutes at 2500 rpm. Five ml of the supernatant liquid was removed, filtered through a 0.2 µM syringe filter and digested in concentrated HNO$_3$ before analysis by graphite furnace atomic adsorption spectrometry (GFAAS) for total Zn. The pH's of the supernatant solutions were measured to ensure that the chelating agents did not alter the pH of the soil solutions during the course of the experiment.

Results

Figure 3:
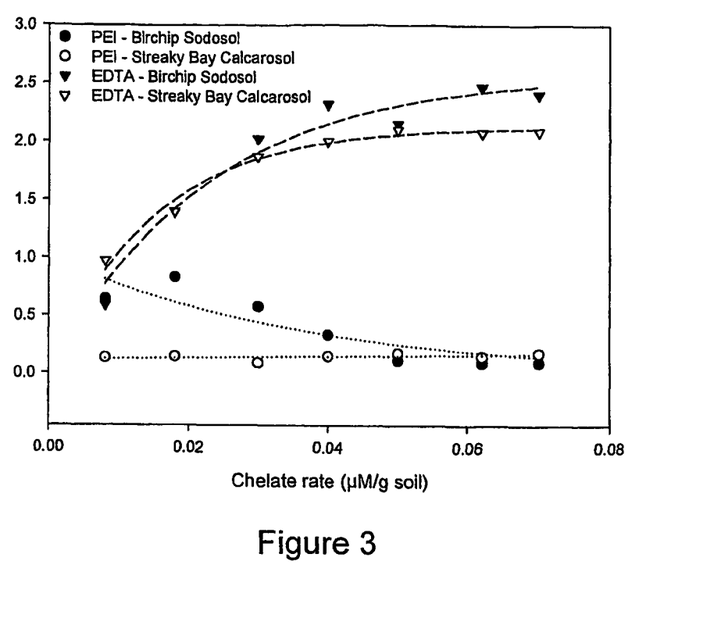
FIG. 3 is a graph showing the amount of Zn remaining in soil solution after 24 hours.

EDTA significantly increased the amount of Zn in the solution phase of both soils (FIG. 3). However, EDTA did not increase plant uptake of Zn (FIG. 1). These results indicate that plant roots did not readily absorb the ZnEDTA complexes.

PEI increased Zn adsorption to the soil solid phase (FIG. 3). However, in the pot experiment, PEI significantly increased plant uptake of Zn (FIG. 1). These results suggest that the Zn complexed by PEI was retained within the soils 'plant-available' pool of metal ions despite being associated with the soils solid phase.

Uptake of Chelated Zn by Canola Grown in Solution Culture

The purpose of this experiment is to show that EDTA reduces the rate of micronutrient absorption by plant roots.

The purpose is to show that PEI increases the rate of micronutrient absorption by plant roots.

Materials and Methods

Pretreatment:

Pre-germinated canola seedlings were grown in complete nutrient solution for 13 days. The canola plants, three per pot, were transferred to pre-treatment solution for 24 hours. Pre-treatment solution contained 2 mM NaMES (pH 6.0) and 0.5 mM CaCl$_2$. Following pre-treatment, the plants were used in the $^{65}$Zn uptake experiments.

Uptake of $^{65}$Zn from Ice-cold Solutions:

Canola seedlings were transferred to ice-cold uptake solutions containing 2 mM NaMES (pH 6.0), 0.5 mM CaCl$_2$ and 10 µM ZnCl$_2$ as either the metal salt or chelated by 10 µM EDTA or 5 µM PEI. Uptake solutions were spiked with $^{65}$Zn to give 0.037 MBq L$^{-1}$. Each treatment was replicated in triplicate.

After 30 minutes the canola roots were removed from the uptake solutions and rinsed with MilliQ water. Those roots used to measure symplastic absorption of Zn were transferred to ice-cold desorption solutions for 30 minutes in order to desorb apoplastically bound Zn. Desorption solutions contained 2 mM Na-MES (pH 6.0), 5 mM CaCl$_2$ and 60 µM ZnCl$_2$.

Canola plants were separated into roots and shoots, blotted dry and weighed. Roots were transferred into radioactivity counting vials, to which 4 ml of 5M HNO$_3$ was added. Samples were left overnight to solubilise the cell contents before the $^{65}$Zn contents of roots were determined by gamma spectroscopy.

Results

Figure 4:
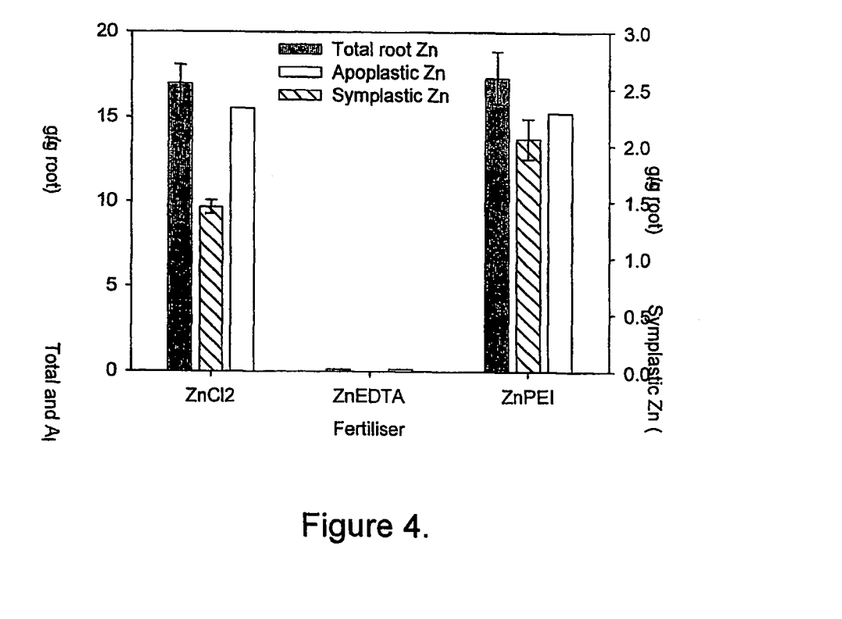
FIG. 4 is a graph of the uptake of Zn fertilisers into the apoplast and symplast of canola roots.

Zn complexed by EDTA was not readily absorbed into either the root symplast or apoplast (FIG. 4). These results explain why canola plants did not readily absorb ZnEDTA from the solution phases of the alkaline and calcareous soils (FIGS. 1 and 3).

PEI significantly increased intracellular uptake of Zn (uptake into the root symplast). In fact, the use of PEI increased symplastic absorption of Zn by 42% compared with the application of ZnCl$_2$ alone (FIG. 4).

PEI Molecular Weight (MW) and Structure Affected Trace Element Chelation, Absorption by Plant Roots and Translocation to Plant Shoots Materials and Methods Branched PEI was obtained from Sigma-Aldrich in average MW's of (atomic mass units-amu) 423, 800, 1200, 1800, 25000 and 750000. Linear PEI was obtained from Polysciences with average MVPs of 2500 amu and 25000 amu.

PEI Complexing Capacity (CC) and the Stability of Cu-PEI.

The Cu(II) complexing capacity of each form of PEI was measured by titration using a Cu(II) ion selective electrode (Orion 9629) to measure the free Cu$^{2+}$ activity in solution (Kaschl et al, 2002). Scatchard plots were drawn to determine the stability constants (Log$_{10}$K) of Cu-PEI and Cu-rhamnolipid complexes.

Calibration of the ISE was performed in a solution containing 0.001 M CuSO$_4$, 0.084M KNO$_3$ and 0.0045M EN. All reagents were made up using MilliQ water. The Cu(II) ISE was polished using the manufacturers polishing strip prior to each titration. Solution pH was altered by incremental addition of 0.1 M KOH and the activity of Cu(II) in solution calculated using GEOCHEM-PC with each pH change.

A weighed sample of each ligand was mixed into a salt-buffered solution containing 0.095M KNO3 and 0.005M EN. The solution was stirred continuously with a magnetic stirrer bar and the pH altered to pH 5.8 using 0.1M KOH or 0.1M HNO$_3$. Measured volumes of 0.01M CuSO$_4$ were titrated into the chelate solution, and incremental additions of 0.1 M KOH were used to maintain constant pH. The mV output from the Cu(II) probe was recorded when a stable reading was achieved (~5 minutes). The activity of free Cu$^{2+}$ was then calculated from the calibration curve. Each titration was replicated in triplicate.

The free Cu$^{2+}$ activity was plotted against the ratio of total Cu$^{2+}$ and ligand concentrations in the titration vessel. The x-axis intercept of the linear regression was considered to be equivalent to the metal complexing capacity of each PEI ligand (Kaschl et al. 2002).

Conditional average stability constants were determined from the titration data using the Scatchard plot method. Briefly, the ratio of metal binding sites filled by Cu ($\theta$) were defined by:

$$\theta = \frac{\text{Molar conc. of bound metal ion}}{\text{maximum complexing capacity}} \qquad [1]$$

Hence, $\theta=1$ at when all of the ligand binding sites have been filled by Cu.

Scatchard plots were graphed ($\theta/M$ versus $\theta$), where M is the activity of free Cu$^{2+}$ ions, from which conditional average stability constants (pKi) were derived from the slope of each graphed point (Stevenson 1994).

Stability constants were measured in a solution buffered with 95 mM KNO$_3$ and 5 mM EN. Adjustment for infinite dilution was performed using the Davies equation:

$$\log(\gamma \pm) = -A|Zm||Zn|\left[\frac{\sqrt{\mu}}{1+\sqrt{\mu}} - 0.2\mu\right] \qquad [2]$$

Where $\mu$=ionic strength, Zm & Zn=ion charges, $\gamma$=activity coefficient at $\mu$=0, A=constant unique to the solvent & temperature (A=0.512 for water at 25° C.).

PEI stability constants were not adjusted for infinite dilution because the exact polarity of each polymer was unknown.

Uptake Kinetics

Canola seedlings (*Brassica napus* var. *Pinnacle*) were pre-germinated on filter paper moistened with deionised water. On day 6, the seedlings were transferred to complete nutrient solution and moved into the glasshouse. The nutrient solution contained Ca (3.55 mM), Mg (1.45 mM), NO$_3^-$ (8.1 mM), H$_2$PO$_4^-$ (0.2 mM), Cl (10 µM), Na (1.1 mM), K (1.2 mM), SO$_4$ (1.45 mM), H$_3$BO$_3$ (30 µM), MoO$_4^{2-}$ (0.2M), FeEDDHA (25 µM), Mn (10 µM), Zn (1 µM), Cu (1 µM), buffered at pH 6.0 with 2 mM MES (2-morpholinoethanesulphonic acid, 50% as potassium salt) (Kupper et al, 2000). After 14 days, the canola plants, three per pot, were transferred to pre-treatment solution for 24 hours. Pre-treatment solution contained 2 mM NaMES (pH 6.0) and 0.5 mM CaCl$_2$. Following pre-treatment, the plants were used in the $^{65}$Zn uptake experiments.

Kinetic Uptake and Translocation of Zn from PEI-buffered Solutions

Pre-treated canola seedlings were transferred to uptake solutions containing 2 mM KMES (pH 6.0), 0.5 mM CaCl$_2$ and 1 µM ZnSO$_4$ as either the metal salt or chelated with EDTA (control) or the eight forms of PEI described above. Each chelate was applied at four rates according to its complexing capacity, so that the percentage of Zn chelated approximated 0% (chelate-free controls) 25%, 50%, 75% and 100% of the total solution Zn. Each treatment was replicated in triplicate. Hanging mercury drop anodic stripping voltammetry was used to measure the concentration of labile Zn in each uptake solution, an approximate measure of free (or kinetically labile) versus chelated Zn. Uptake solutions were spiked with $^{65}$Zn to give 0.037 MBq/L.

After a 24-hour uptake period, canola shoots were harvested, weighed and digested in concentrated HNO$_3$ at 140° C. Digest solutions were transferred to radioactivity counting vials for $^{65}$Zn measurement by gamma spectroscopy.

The Zn transfer coefficient ($K_T$) (Zn uptake and translocation to canola shoots per unit of free, non-chelated, Zn supplied to roots) was used to compare the availability of chelated Zn between PEI and EDTA treatments:

$$K_T \text{ (L/g shoot)} = \frac{Zn \text{ uptake } \left(\frac{\mu g \, Zn}{g \text{ shoot}}\right)}{ASV \text{ labile } Zn \left(\frac{\mu g \, Zn}{L}\right)} \qquad [4]$$

ANOVA followed by the L.S.D. test was used to determine statistical significance at the 0.05 probability level.

Results

PEI Complexing Capacity (CC) and the Stability of Cu-PEI

Figure 5:
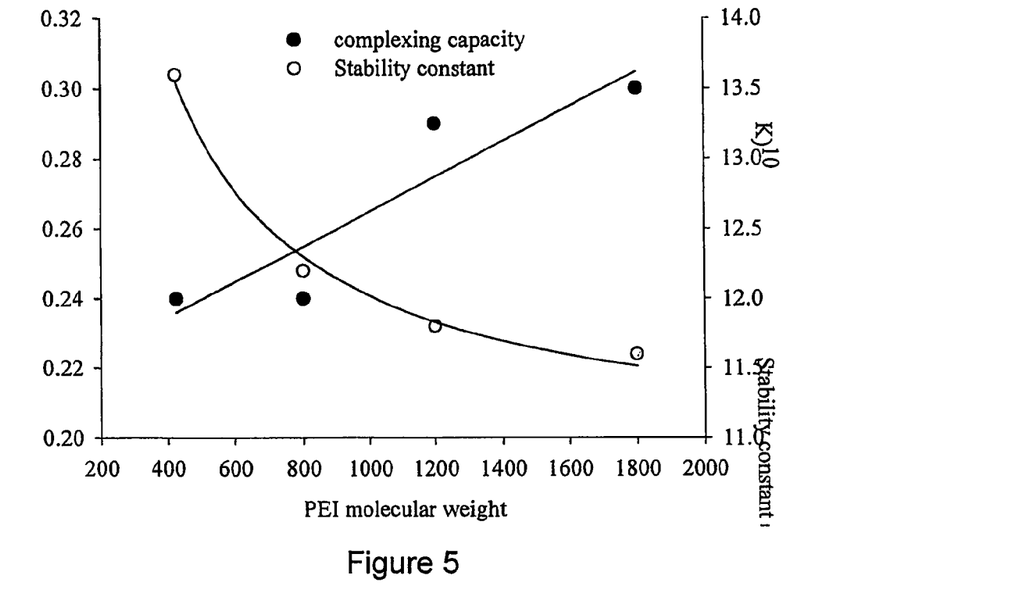
FIG. 5 is a graph of the relationship between PEI molecular weight and the complexing capacity and stability of Cu(II)-PEI complexes.

The capacity of PEI to complex Cu$^{2+}$ was generally not strongly influenced by the molecular weight of the polymer (Table 2). However, there was a small increase in the Cu(II) CC with increasing PEI MW up to 1800 amu (FIG. 5). The CC's of linear PEI were more than twofold higher than those of branched PEI (Table 2). However, the Cu(II) CC's of all polymers were substantially below that previously measured for branched PEI obtained from BASF (Stacey 2006). Therefore, it appears that the CC's of polymers vary significantly between manufacturers.

TABLE 2

The complexing capacity (CC) and stability constants (Log$_{10}$Ki) of Cu-PEI and Cu-rhamnolipid complexes.

| Ligand | Average M$_w$ | Ligand CC (g Cu/g ligand) | Highest recorded Log$_{10}$Ki | Average Log$_{10}$Ki at CC |
|---|---|---|---|---|
| Branched PEI | 425 | 0.24 | 13.6 | 9.5 |
|  | 800 | 0.24 | 12.2 | 10.9 |
|  | 1200 | 0.29 | 11.8 | 10.1 |
|  | 1800 | 0.30 | 11.6 | 10.1 |
|  | 25000 | 0.31 | 11.2 | 9.1 |
|  | 750000 | 0.30 | 11.2 | 9.5 |
| Linear PEI | 2500 | 0.70 | 10.7 | 7.9 |
|  | 25000 | 0.52 | 9.6 | 8.3 |

There was a small decrease in complex stability (Log$_{10}$K) with increasing molecular weight (Table 2, FIG. 5). Linear PEI's formed less stable complexes with Cu$^{2+}$ than branched PEI (Table 2). This instability may have been due to incomplete ring formation; linear PEI would probably have more difficulty forming true chelate rings around metal ions than branched PEI. The importance of ring formation to complex stability has been well documented (Mellor 1964).

Kinetic Uptake and Translocation of Zn

The Zn transfer coefficient is essentially a measure of Zn uptake and translocation to canola shoots per unit of free (non-chelated) Zn$^{2+}$ supplied to the roots. A high transfer coefficient indicates that chelated Zn was readily absorbed and translocated to canola shoots. A low transfer coefficient suggests that the chelated Zn was not readily absorbed by canola.

Figure 6:
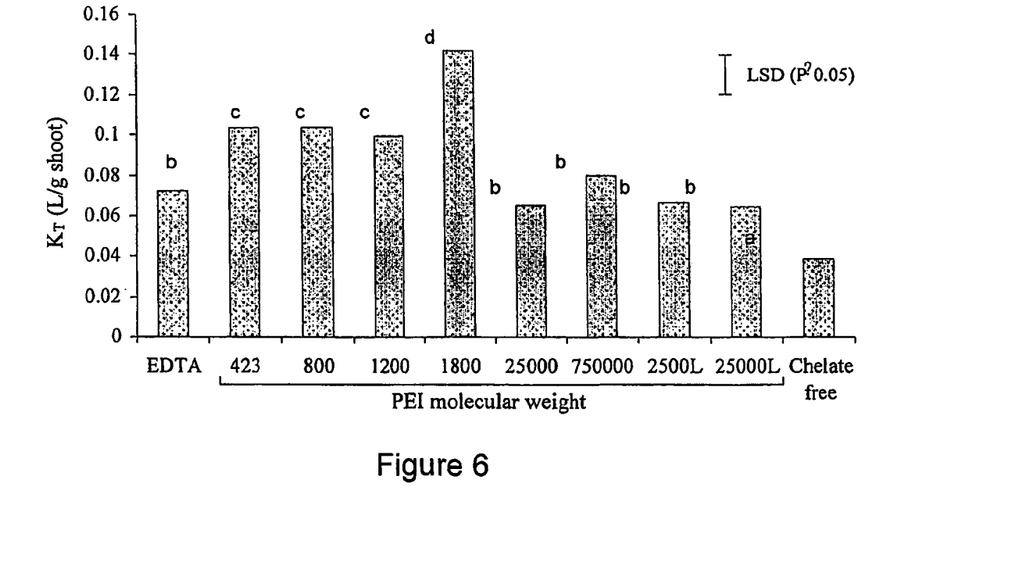
FIG. 6 is a graph of the mean transfer coefficients for Zn uptake and translocation into canola shoots from chelate-buffered solutions.

Mean transfer coefficients showed that Zn uptake was significantly ($P \leq 0.05$) affected by chelate type and the MW of PEI (FIG. 6). Canola readily absorbed Zn chelated by PEI within the MW range of 423-1800 amu. Zn complexed by high MW PEI ($\geq 25000$ amu) or EDTA was not readily absorbed and translocated to canola shoots (FIG. 6). The existence of a MW cut-off was more clearly evident at the highest chelate application rate, when Zn absorption was limited by the availability of free (non-chelated) $Zn^{2+}$ (FIG. 7).

Figure 7:
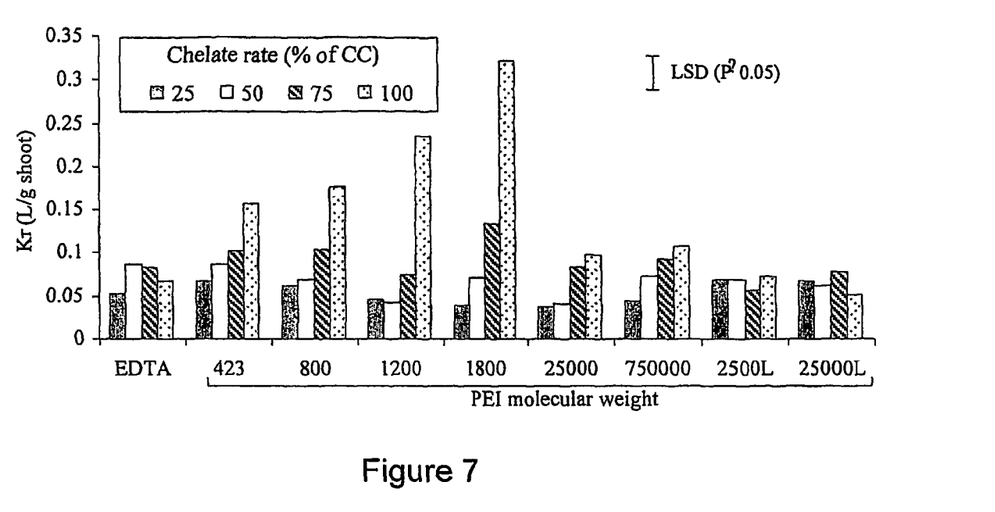
FIG. 7 is a graph of the transfer coefficients for Zn uptake by canola with increasing chelate rates.

Neither linear PEI increased the Zn transfer coefficient (FIG. 6, FIG. 7). This was because the two linear forms of PEI did not significantly decrease ASV-labile Zn in the uptake solutions (probably due to Zn-PEI dissociation during ASV analysis). Dissociation seems likely, because linear PEI also produced relatively unstable complexes with $Cu^{2+}$ (Table 2). Nevertheless, linear forms of PEI are unlikely to be used in fertilizer products due to their high cost and poor solubility when compared with branched PEI.

What can now be seen then is that the use of a chelating polymer, such as PEI, is that it is possible to provide greater levels of micronutrients to plants than was achievable prior to this discovery.

Although the invention has been herein shown and described in what is conceived to be the most practical and preferred embodiment, it is recognized that departures can be made within the scope of the invention, which is not to be limited to the details described herein and that modifications may be made that do not depart from the scope of the invention so as to embrace any and all equivalent compositions and methods.

Chandrasekaran E V and BeMiller J N 1980 Constituent analysis of glycosaminoglycans. In Methods in Carbohydrate Chemistry, Eds W R. L. and W M. L. pp 89-96. Academic Press, New York.

Kaschl A, Romheld V and Chen Y 2002 Cadmium binding by fractions of dissolved organic matter and humic substances from municipal solid waste compost. Journal of Environmental Quality 31, (6) 1885-1892.

Kupper H, Lombi E, Zhao F J and McGrath S P 2000 Cellular compartmentation of cadmium and zinc in relation to other elements in the hyperaccumulator *Arabidopsis halleri*. Planta 212, 75-84.

Mellor D P 1964 Historical background and fundamental concepts. In Chelating Agents and Metal Chelates, Eds F P Dwyer and D P Mellor. pp 1-50. Academic Press, Inc., New York.

Stacey S P 2006 New micronutrient fertilisers for alkaline soils. PhD Thesis, University of Adelaide.

Stevenson F J 1994 Stability constants of metal complexes with humic substances. In Humus Chemistry: Genesis, Composition, Reactions. pp 405-428. John Wiley & Sons, Inc., New York.

The invention claimed is:

1. A method of providing micronutrients to a plant, which includes applying to an area of the plant or soil/substrate surrounding the plant an effective amount of a plant fertiliser composition comprising a chelating polymer co-ordinately bonded to a micronutrient to form a chelate, the chelate transporting the micronutrients across a membrane of the plant and releasing the micronutrients within the plant for use by the plant, wherein the chelating polymer is a polythiol or polyamine having the general formula:

wherein X is nitrogen (N) or sulfur (S), W is equal to or greater than 0, and y, z and n are equal to or greater than 1, and wherein the micronutrient is at least one micronutrient selected from the group consisting of zinc, manganese, iron and nickel.

2. The method of claim 1, wherein X is N.

3. The method of claim 2, wherein the molecular weight of said polyamine is between 400 and 25,000.

4. The method of claim 1, wherein the composition is applied in combination with a macronutrient selected from the group consisting of N, P, K, S, Ca, Mg and mixtures thereof.

5. The method of claim 4, wherein the composition is in a form selected from the group consisting of liquids, suspensions, dispersions, emulsions, powders, and pellets.

6. The method of claim 5, wherein the composition further includes a pesticide and/or insecticide.

7. The method of claim 6, wherein the composition is applied to the foliage of the plant, soil or other substrate, seeds, fruits, shoots, flowers or nuts.

8. A method of increasing the bioavailability of nutrients to plant roots or foliage, comprising applying to the plant or soil/substrate around the plant an effective amount of a plant fertiliser composition including a micronutrient co-ordinately bonded to a polymer to form a chelate, wherein the micronutrient is at least one micronutrient selected from the group consisting of zinc, manganese, iron and nickel, the polymer having the formula (I):

wherein X is nitrogen (N) or sulfur (S), W is equal to or greater than 0, and y, z and n are equal to or greater than 1, wherein the chelate, after being applied to the plant or soil/substrate, is then transported across a plant membrane and into the plant where the chelated micronutrient is then released.

9. The method of claim 8, wherein X is N.

10. The method of claim 9, wherein the molecular weight of said polyamine is between 400 and 25,000.

11. A plant fertiliser composition comprising:
a chelating polymer having the general formula:

wherein X is nitrogen (N) or sulfur (S), W is equal to or greater than 0, and y, z and n are equal to or greater than 1; and
a micronutrient coordinately bonded to the chelating polymer to form a chelate, wherein the micronutrient is selected from the group consisting of zinc, manganese, iron and nickel.

12. The composition of claim 11, wherein X is N.

13. The composition of claim 12, wherein the composition is in a form selected from the group consisting of liquids, suspensions, dispersions, emulsions, powders, and pellets.

14. The composition of claim 13, wherein the composition includes a pesticide and/or insecticide.

15. The composition of claim 12, wherein the molecular weight of said polyamine is between 400 and 25,000.

\* \* \* \* \*